United States Patent
Robinson et al.

[11] Patent Number: 5,995,970
[45] Date of Patent: Nov. 30, 1999

[54] METHOD AND APPARATUS FOR GEOGRAPHIC COORDINATE DATA STORAGE

[75] Inventors: Stephen C. Robinson, Olathe, Kans.; Darin J. Beesley, Kansas City, Mo.; Thomas H. Walters, Gardner, Kans.

[73] Assignee: Garmin Corporation, Taiwan

[21] Appl. No.: 08/904,642

[22] Filed: Aug. 1, 1997

[51] Int. Cl.[6] .......................... G06F 12/02; G06F 9/302
[52] U.S. Cl. .................. 707/101; 707/102; 707/104; 711/170; 701/200; 701/208
[58] Field of Search ........................ 711/170; 701/200, 701/208, 209; 707/100, 101, 102, 104, 2; 708/201, 203, 207; 364/578; 345/202; 379/88.1; 382/201, 232, 244

[56] References Cited

U.S. PATENT DOCUMENTS

| | | |
|---|---|---|
| D. 365,032 | 12/1995 | Laverick et al. . |
| 4,613,913 | 9/1986 | Phillips . |
| 4,646,015 | 2/1987 | Phillips . |
| 4,677,563 | 6/1987 | Itoh et al. ................................ 701/208 |
| 4,686,642 | 8/1987 | Buxton et al. . |
| 4,734,863 | 3/1988 | Honey et al. . |
| 4,788,645 | 11/1988 | Zavoli et al. . |
| 4,796,191 | 1/1989 | Honey et al. . |
| 4,811,491 | 3/1989 | Phillips et al. . |
| 4,811,613 | 3/1989 | Phillips et al. . |
| 4,914,605 | 4/1990 | Loughmiller, Jr. . |
| 4,939,661 | 7/1990 | Barker et al. ............................ 701/200 |
| 5,067,081 | 11/1991 | Person ..................................... 701/202 |
| 5,204,817 | 4/1993 | Yoshida . |
| 5,247,356 | 9/1993 | Ciampa ................................... 348/144 |
| 5,297,051 | 3/1994 | Arakawa et al. . |
| 5,311,195 | 5/1994 | Mathis et al. . |
| 5,426,780 | 6/1995 | Gerull et al. ............................. 707/3 |
| 5,477,458 | 12/1995 | Loomis .................................... 701/215 |
| 5,546,107 | 8/1996 | Deretsky et al. . |
| 5,559,707 | 9/1996 | DeLorme et al. ...................... 701/200 |
| 5,751,612 | 5/1998 | Donovan et al. ...................... 364/578 |

*Primary Examiner*—B. James Peikari
*Attorney, Agent, or Firm*—Shook, Hardy & Bacon, L.L.P.

[57] ABSTRACT

The storage space required for representing geographic features is reduced by determining an optimum number of bits that can be used to store coordinate data along each separate axis. Any coordinate change that cannot directly fit within the optimum bit size is subjected to an escape sequence made up of one or more special values and a normal value that fits in the optimum bit size. The special values are obtained by a predetermined calculation for each bit size. If all changes for one axis are in the same direction and special values are not needed, a global sign can be used to further enhance use of the available space on the storage medium.

18 Claims, 5 Drawing Sheets

METHOD AND APPARATUS FOR GEOGRAPHIC COORDINATE DATA STORAGE

FIELD OF THE INVENTION

This invention relates generally to the storage of data representing geographic features and more particularly to a method and apparatus for storing geographic coordinate data in a manner to reduce the space it occupies in the storage medium of a microprocessor-implemented data processing system.

BACKGROUND OF THE INVENTION

In a variety of applications, geographic features can be represented by coordinate sets and stored in computer data bases in the form of bits representing the coordinate information. The coordinate information often requires a large amount of storage space on the medium that is used to store it. This always presents a significant problem and becomes particularly undesirable when the storage medium has limited capacity that may not be sufficient to handle the data that must be stored.

Polyline and polygon features can be represented by a starting x-y coordinate pair and a list of coordinate changes between successive coordinate pairs. Geographic features vary widely in size and shape, and some features have large changes in the coordinates while others have only small changes. It is not uncommon, especially with man-made structures, for a feature to have large ranging changes in one coordinate direction and only small changes in the other direction. For example, roadways and grids of streets often follow north-south or east-west paths. Other features, both natural and man-made, exhibit similar characteristics.

SUMMARY OF THE INVENTION

The present invention reduces the storage space that is required to store geographic feature data by taking advantage of the frequent occurrence of features having predominantly only small coordinate changes in one direction. In accordance with the invention, the changes in the coordinates for each geographic feature are examined in both coordinate directions so that these changes can be analyzed and an optimum number of maximum allowable bits can be determined for each coordinate direction. The list of changes in the coordinates can then be packed using a storage size that is optimized for each direction. By determining the optimum storage size for each coordinate direction on a per feature basis rather than for the data base as a whole, there is less waste of available space on the storage medium. Consequently, the storage medium can handle features in a larger geographic area.

The optimum bit number ("delta size") is an integer that is determined by testing each possible delta size for potential use with all of the actual coordinate changes. The delta size for each coordinate direction that results in the fewest total number of bits is selected as the optimum delta size for that coordinate direction. The coordinate changes ("deltas") in each coordinate direction are then packed using the optimum delta size for that direction.

Any actual delta that cannot be represented by the optimum delta size number of bits is stored as an escape sequence. The escape sequence contains one or more special delta values that are predetermined for the delta size that is being used, followed by a normal delta value. Each special delta value indicates that the normal delta value is to be increased by an amount corresponding to the special value times the number of special values that are stored.

In some situations, all of the deltas for one or both coordinate directions may have the same sign; i.e., all coordinate changes may be in the same direction. The present invention takes advantage of this circumstance by applying a global sign to the entire set of deltas when all of them have the same sign. As a consequence, each packed delta value does not require its own individual sign bit, and the space occupied by sign bits can be used for other purposes.

This storage technique provides significant advantages in that it uses the available storage medium space more efficiently in a large number of situations. When one coordinate direction has only small deltas for a given geographic feature while the other coordinate direction has larger ranging deltas, the space otherwise used for the small delta coordinate direction can be used for other data. Also, in a situation where most of the deltas in one direction are small and only a small number of deltas are large, the large delta values do not unduly penalize the remaining small deltas because they are all packed using an optimum delta size that is smaller than the large delta values would otherwise require using a standard storage scheme.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

The present invention is directed to a method and apparatus for efficiently storing data representing the coordinates of a geographic feature in an efficient manner using a computer and software which is represented in flow chart form in FIGS. 1a–1e. In accordance with the invention, a particular geographic feature having known coordinates which are to be stored is represented by a starting coordinate pair and a list of successive coordinate changes ("deltas"). The starting coordinates and all of the coordinate deltas are stored with the deltas using a maximum allowable number of bits ("delta size") which is optimized for each coordinate direction.

Optimization of the delta size involves making use of an escape sequence for deltas that cannot be represented directly by the delta size number of bits. The escape sequence makes use of special delta values followed by a normal delta value. The optimization technique involves testing all of the coordinate deltas using all of the possible delta sizes and selecting a delta size that results in the fewest total number of bits. A special delta value is assigned to each delta size and is unique to that delta size. The special delta value implies a preselected additional delta length which is set equal to $2^{\Delta size-1}-1$. Table 1 below is a table of example delta sizes, the special delta values in hexadecimal form and the additional delta length that is implied by each special value for each example delta size.

TABLE 1

| Delta size in bits | Special delta value (hexadecimal) | Additional delta length implied by special value |
|---|---|---|
| 2  | 0 × 00000002 | 1 |
| 3  | 0 × 00000004 | 3 |
| 4  | 0 × 00000008 | 7 |
| 5  | 0 × 00000010 | 15 |
| 6  | 0 × 00000020 | 31 |
| 7  | 0 × 00000040 | 63 |
| 8  | 0 × 00000080 | 127 |
| 9  | 0 × 00000100 | 255 |
| 10 | 0 × 00000200 | 511 |
| 11 | 0 × 00000400 | 1023 |
| 12 | 0 × 00000800 | 2047 |
| 13 | 0 × 00001000 | 4095 |
| 14 | 0 × 00002000 | 8191 |
| 15 | 0 × 00004000 | 16383 |
| 16 | 0 × 00008000 | 32767 |
| 17 | 0 × 00010000 | 65535 |
| 18 | 0 × 00020000 | 131071 |
| 19 | 0 × 00040000 | 262143 |
| 20 | 0 × 00080000 | 524287 |
| 21 | 0 × 00100000 | 1048575 |
| 22 | 0 × 00200000 | 2097151 |
| 23 | 0 × 00400000 | 4194303 |
| 24 | 0 × 00800000 | 8388607 |
| 25 | 0 × 01000000 | 16777215 |
| 26 | 0 × 02000000 | 33554431 |
| 27 | 0 × 04000000 | 67108863 |
| 28 | 0 × 08000000 | 134217727 |
| 29 | 0 × 10000000 | 268435455 |
| 30 | 0 × 20000000 | 536870911 |
| 31 | 0 × 40000000 | 1073741823 |
| 32 | 0 × 80000000 | 2147483647 |

By way of example, if the delta size that is being used is 7 and there are two special values indicated followed by a normal delta value of −15, the actual delta value is −141. The two special values amount to a length increase of 126, and they are by definition the same sign as the normal delta value.

In carrying out the invention, binary numbers are assigned base ten numbers in accordance with the following Table 2.

TABLE 2

| BINARY NO. | BASE 10 NO. |
|---|---|
| 10 | SPECIAL VALUE |
| 11 | −1 |
| 00 | 0 |
| 01 | 1 |
| 100 | SPECIAL VALUE |
| 101 | −3 |
| 110 | −2 |
| 111 | −1 |
| 000 | 0 |
| 001 | 1 |
| 010 | 2 |
| 011 | 3 |

Delta sizes of four bits and more are treated similarly with the special value for each delta size being the binary number 1 followed by a number of zeros equal to the delta size minus one. The positive and negative signs are likewise handled in a similar manner in larger delta sizes.

Figure 1A:
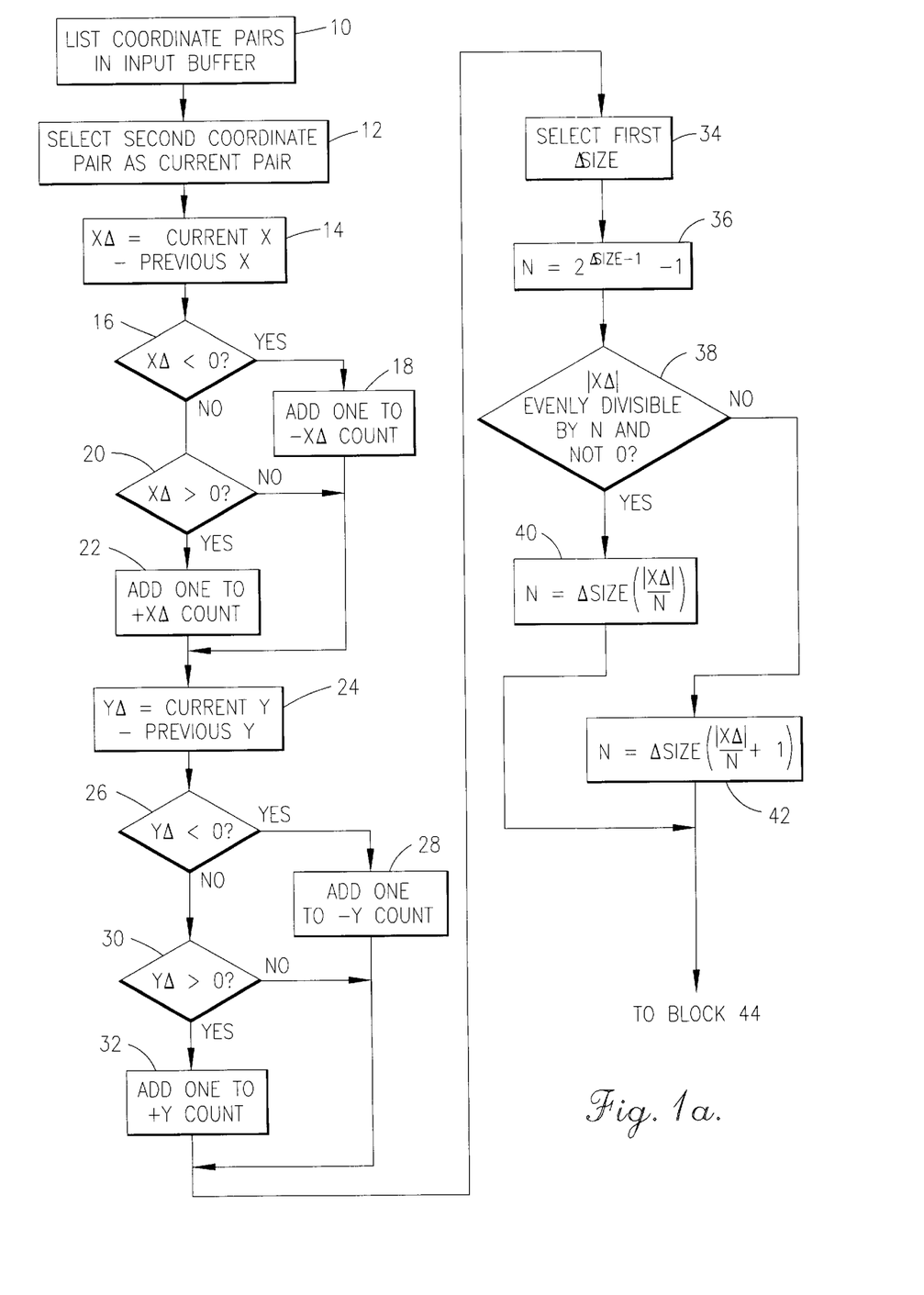
FIGS. 1A, 1B, 1C, 1D and 1E represent a flow chart for the software which may be used with a computer to implement the method and apparatus of the present invention.

With reference now to the flow chart in detail and initially to FIG. 1A, the x-y coordinate pairs are listed in the input buffer as indicated by numeral 10. Next, the second coordinate pair is selected as the current coordinate pair as indicated in block 12. The x delta (change in the x coordinate) is set equal to the current x coordinate value minus the previous x coordinate value, as indicated in block 14.

In order to determine whether all of the x deltas are in either the plus or minus direction, the step indicated in block 16 is carried out. If the x delta is less than zero, the operation in block 18 is effected and the minus x delta counter is incremented by one. Otherwise, the operation in block 20 determines whether the x delta is greater than zero. If it is, block 22 is entered and the positive x delta counter is incremented by one. From either block 18 or block 22, block 24 is entered and the y delta is set equal to the current value of y minus the previous value of y.

If the y delta value is less than zero as indicated in block 26, the negative y counter is incremented by one in block 28. Otherwise, a determination is made as to whether the y delta value is greater than zero as indicated in block 30. If the y delta value is greater than zero, the positive y counter is incremented in block 32.

Next, the delta sizes are tested in succession for a determination of which delta size is the optimum size for each coordinate direction. The first delta size is selected in block 34 which is entered from either block 28 or block 32. The first delta size may be equal to two bits as shown in Table 1. As indicated in block 36, N is set equal to $2^{\Delta size-1}-1$. For example, with an initial delta size of 2, N=2−1=1.

If the absolute value of x delta is evenly divisible by N and is not equal to zero, as determined by the operation in block 38, N is set in block 40 equal to the delta size times the absolute value of x delta divided by N. Otherwise, block 42 is entered and N is set equal to the delta size times the sum of 1 plus the absolute value of x delta divided by N. In the calculation made in block 42, the quantity determined as the absolute value of x delta divided by N is rounded to an integer value by discarding any fractional quantity.

Figure 1B:
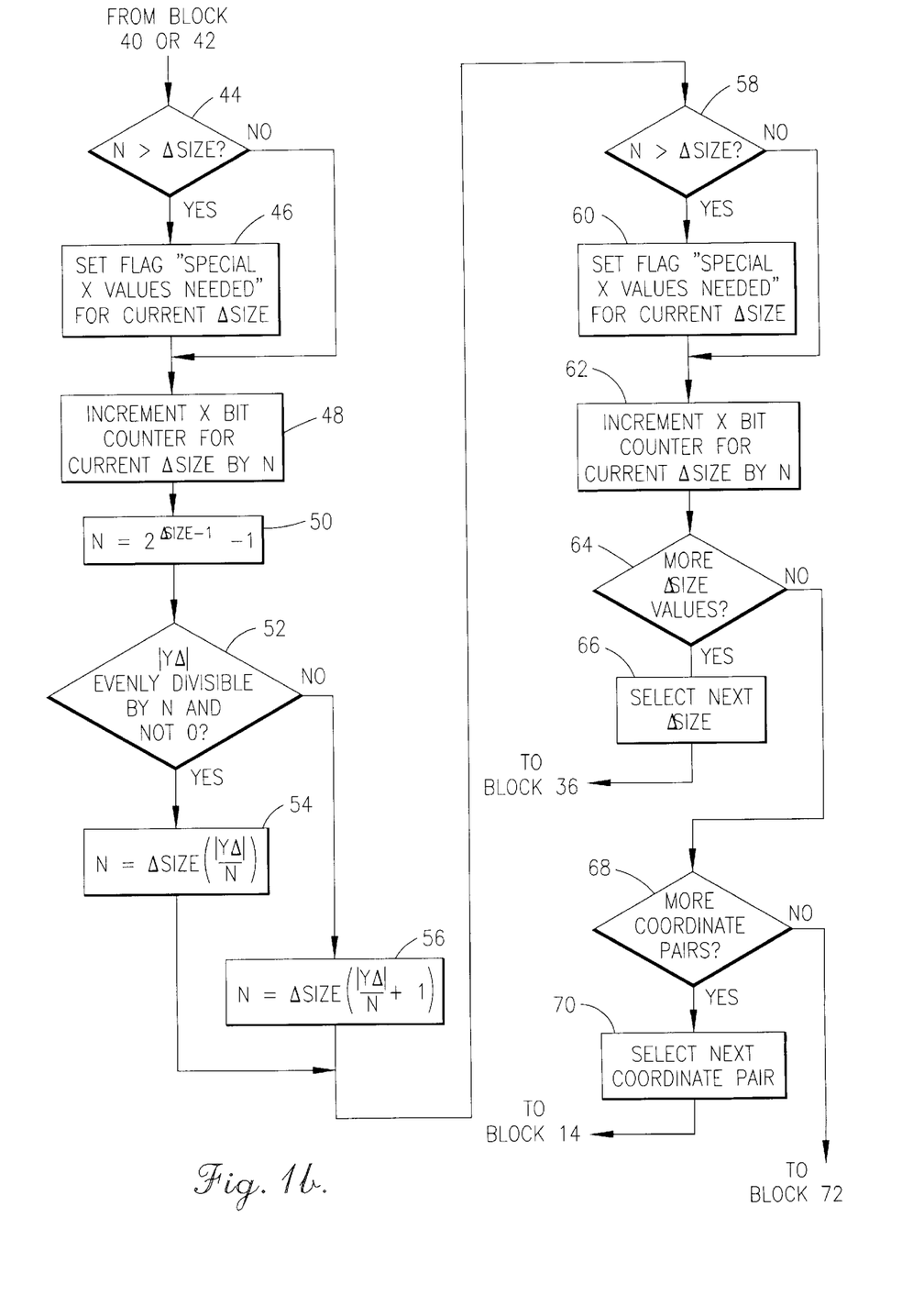

Referring now to FIG. 1B, block 44 is entered from either block 40 or block 42 to make a determination as to whether special x values are needed. If N is greater than the delta size, special values are needed and a flag "special x values needed" that is associated with the current delta size is set in block 46. Otherwise, block 48 is entered directly from block 44 and the x bit counter associated with the current delta size is incremented by a value equal to N. If special x values are needed, block 48 is entered from block 46 after the "special x values needed" flag has been set.

The number of bits needed for the y delta value at the current delta size is determined in a similar manner. As indicated in block 50, N is set equal to $2^{\Delta size-1}-1$. If the absolute value of y delta is evenly divisible by n and is not equal to zero, as determined in block 52, N is set equal to the delta size times the absolute value of y delta divided by N in block 54. Otherwise, N is set equal to the delta size times the sum of 1 plus the absolute value of the y delta divided by N in block 56. In the calculation made in block 56, the quantity determined as the absolute value of y delta divided by N is rounded to an integer value by discarding any fractional quantity. If N is greater than the delta size as determined in block 58, special y values are needed and the "special y values needed" flag that is associated with the current delta size is set in block 60. The y bit counter for this delta size is incremented by N in block 62.

At this point, the number of bits needed to represent the first x delta and the first y delta using the current delta size has been determined, and the x bit and y bit counters have been incremented by the applicable N values to keep track of the total number of x bits and y bits needed for that delta size.

If there are more delta size values to be tested, as determined in block 64, the next delta size is selected in block 66, and block 36 is then entered to repeat the routine for determining bit numbers needed for the next delta size. When all of the delta sizes have been tested, block 68 is entered from block 64 to determine whether all of the coordinate pairs have been used. If they have not, the next coordinate pair is selected in block 70 and block 14 is entered to repeat the routine for determining the number of bits needed for the next coordinate pair for each of the delta sizes. Once all of the coordinate pairs have been tested at all of the delta sizes, the x bit counter contains information indicating the total number of bits used for all of the coordinate changes at each different delta size. Similarly, the y bit counter contains information indicating the total number of y bits needed at each different delta size.

Figure 1C:
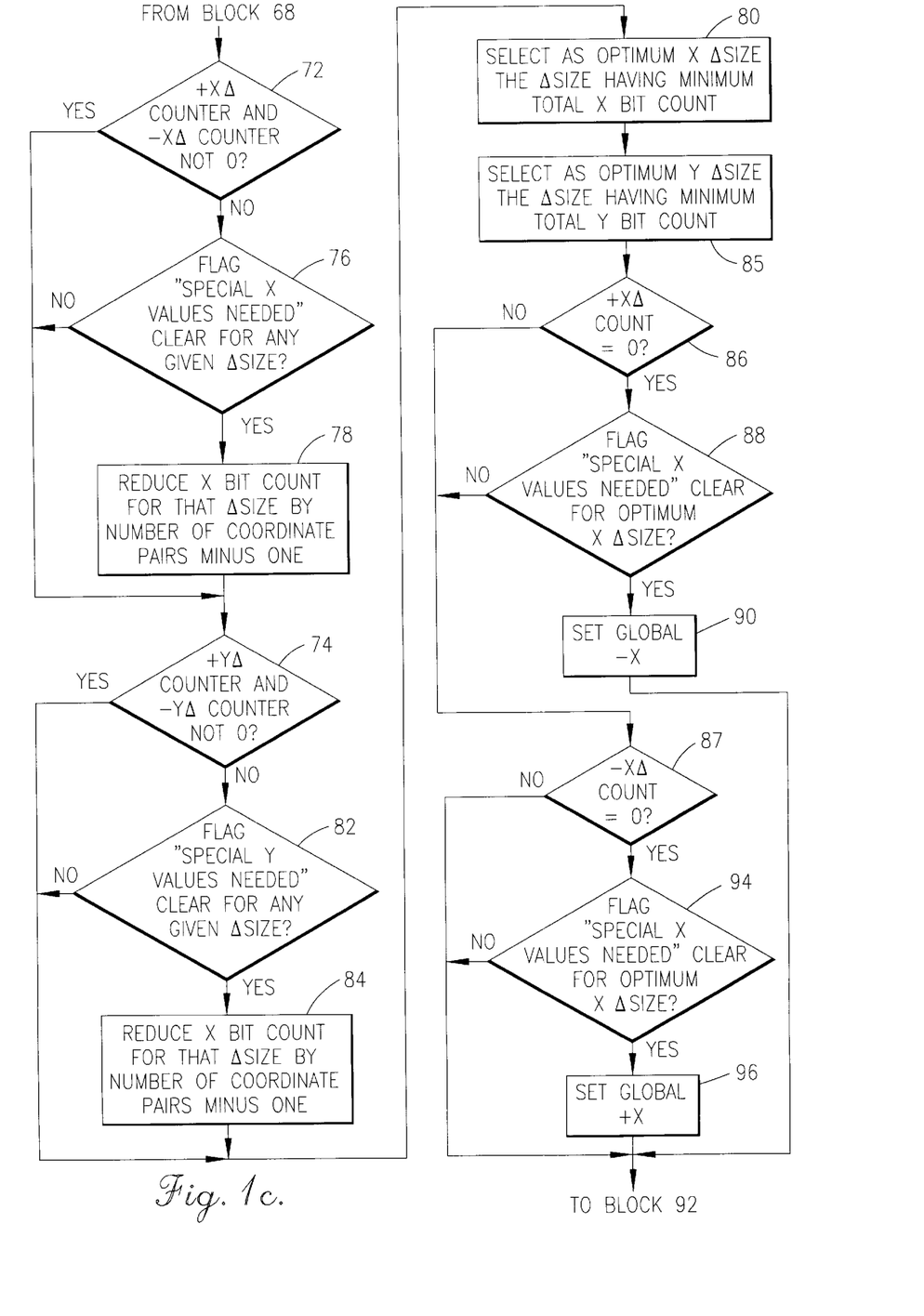

The present invention contemplates the use of a global sign if all of the x deltas or all of the y deltas are identical in sign (i.e., all changes are in the same direction along either coordinate axis) and there are no special values needed. Thus, as shown in FIG. 1C, block 72 is entered from block 68 once all the coordinate pairs have been tested at all delta sizes. If the positive x delta counter and the negative x delta counter are both at a non-zero value, block 74 is entered directly from block 72. However, if either the positive x delta counter or the negative x delta counter is at a value of zero, block 76 is entered to determine whether the "special x values needed" flag is clear for any given delta size. If not, block 74 is entered directly from block 76. If the "special x values needed" flag is clear for any particular delta size, the x bit count for that particular delta size is reduced by a number equal to the number of the coordinate pairs minus one, as indicated in block 78.

The operation in block 78 takes place if either the positive or negative x delta counter is equal to zero (meaning all of the x deltas are in one direction) and there are no special x values needed for a given delta size. A global sign is then available for that delta size, and the x bit counter for that delta size can be reduced by reason of the availability of the global sign. The reduction in the bit count is equal to the number of coordinate pairs minus one because the number of deltas is equal to that number. As indicated in block 74, a determination is made as to whether both the plus y delta counter and the negative y delta counter are non-zero. If they are, block 80 is entered from block 74. If one of the y delta sign counters is at a zero value, all of the y delta changes have been in one direction and a check is made in block 82 as to whether the "special y values needed" flag is clear for any particular delta size. If it is, block 84 is entered and the y bit count for that given delta size is reduced by an amount equal to the number of coordinate pairs minus one. Again, the reason is that the global sign is available for y deltas at the given delta size or sizes where no special y values are needed. Block 80 is entered from block 84.

The total x bit and y bit counts for each delta size are then checked in blocks 80 and 85, and optimum sizes are selected. The optimum x delta size is the delta size that has the least total x bit count. Similarly, the optimum y delta size is the delta size that has the fewest y bit counts.

Before the x delta and y delta values are packed using the optimum delta sizes, a determination is made as to whether global signs can be used. As indicated in block 86, a check is made as to whether the positive x delta count state is equal to zero. If it is not, block 87 is entered to determine whether the negative x delta count is equal to zero. If the positive x delta count value is zero, block 88 is entered from block 86 to determine whether the "special x values needed" flag is clear for the optimum x delta size. If it is not, block 87 is entered from block 88. If it is determined in block 88 that the "special x values needed" flag is clear for the optimum x delta size, a global minus x sign is set in block 90 and the routine proceeds to block 92 (see FIG. 1D). Thus, only if the positive delta x counter equals zero and there are no special x values needed is the global minus x sign set.

Figure 1D:
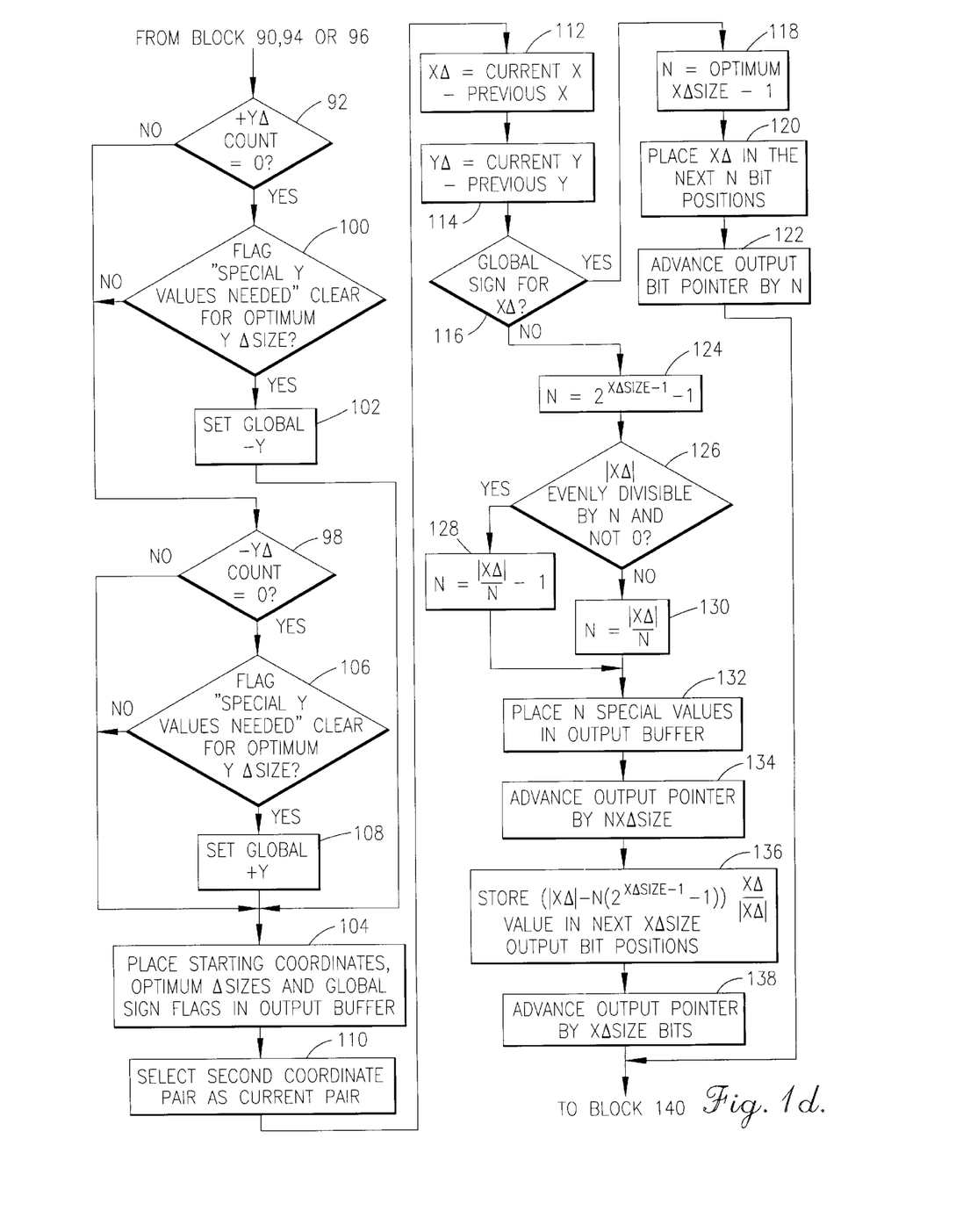

If it is determined in block 87 that the negative x delta count is not zero, block 92 is entered from block 87. However, if the negative x delta count is equal to zero, a check is made in block 94 as to whether the "special x values needed" flag is clear for the optimum x delta size. If it is not clear, block 92 is entered from block 94. If the "special x values needed" flag is clear for the optimum x delta size, a global plus x sign is set in block 96 and the routine proceeds to block 92.

Beginning at block 92 (FIG. 1D), similar determinations are made as to the availability of global y signs. If the positive y delta count is not equal to zero, block 98 is entered from block 92. If the value of the positive y delta count equals zero, a check is made in block 100 as to whether the "special y values needed" flag is clear for the optimum y delta size. If it is not clear, block 98 is entered from block 100. If it is clear, the global minus y sign is set as indicated in block 102. Block 104 is then entered from block 102.

If the minus y delta count is not equal to zero, block 104 is entered from block 98. If the minus y delta count has a value of zero, a check is made in block 106 as to whether the "special y values needed" flag is clear for the optimum y delta size. If it is not, block 104 is entered from block 106. If the flag is clear, the global plus y sign is set in block 108, and block 104 is then entered.

Actual packing of the data coordinates begins by placing the starting coordinates, the optimum delta sizes for the x and y axes and the global sign flags (if any) in the output buffer, as indicated in block 104. The second coordinate pair is selected as the current pair, as indicated in block 110. In blocks 112 and 114, the x and y deltas are set equal to the current values minus the previous values. If it is determined in block 116 that there is a global sign for the x delta, the number of bits, N, is set equal to the optimum x delta size minus one in block 118. The x delta value is then stored by placing it in the next available bit positions, occupying a number of bit positions equal to N, as indicated in block 120. In block 122, the output bit pointer is advanced by N to reflect the bit positions occupied by the x delta bits.

If it is determined in block 116 that there is no global sign for the x delta, N is set equal to $2^{x\Delta size-1}-1$ in block 124. If it is determined in block 126 that the absolute value of x delta is evenly divisible by N and is not equal to zero, the number of special values, N, is set equal to the absolute value of x delta divided by N minus one in block 128. Otherwise, N is set equal to the absolute value of x delta divided by N, as indicated in block 130. In the calculation made in block 130, the result of the division is rounded to an integer value by discarding any fractional quantity.

The program proceeds to block 132 where N special values are placed in the output buffer. In block 134, the output pointer is advanced by a number equal to N times the x delta size to reflect the number of bits occupied by the special value numbers. The next operation involves storing the normal x delta value which is carried out in block 136. The normal delta value has the same sign as the x delta and a magnitude equal to the absolute value of x delta minus N times $2^{x\Delta size-1}1$, and it occupies the next x delta size bit positions. The output pointer is thus advanced by x delta size bits in block 138.

Figure 1E:
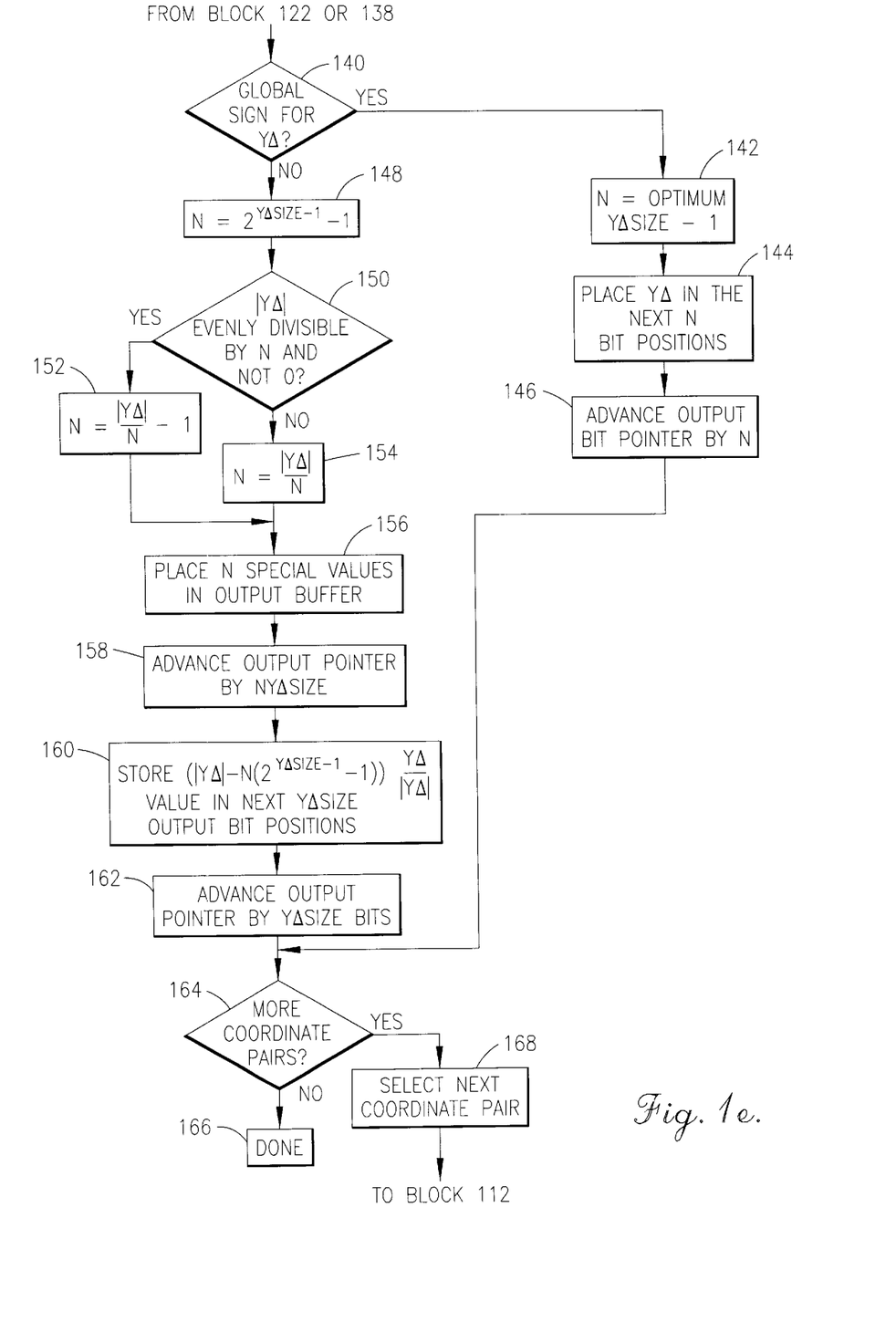

As shown in FIG. 1E, the presence or absence of a global sign for y delta is determined in block 140 which is entered from either block 122 or block 138. If there is a global sign for y delta, the number of y delta bits, N, is set in block 142 equal to the optimum delta size minus 1. The y delta value is then placed in the next N bit positions, as indicated in block 144. The output bit pointer is advanced in block 146 by N, as indicated in block 146.

If there is no global sign available for y delta, block 148 is entered from block 140 and N is set equal to $2^{y\Delta size-1}-1$. If it is determined in block 150 that the absolute value of y delta is evenly divisible by N and is not equal to zero, the number of special values, N, is set in block 152 equal to the absolute value of y delta divided by N minus one. Otherwise, N is set in block 154 as equal to the absolute value of y delta divided by N. In the calculation made in block 154, the result of the division is rounded to an integer value by discarding any fractional quantity. Block 156 is entered from block 152 or block 154, and N special values are placed in the output buffer. The y output pointer is advanced in block 158 by a number equal to N times the y delta size, the number of bits occupied by the special values. The normal y delta value is stored, as indicated in block 160, in the next y delta size bit positions. Its value has the same sign as the y delta and a magnitude equal to the absolute value of y delta minus N times $2^{y\Delta size-1}-1$. The output pointer is then advanced by y delta size bits as indicated in block 162.

Block 164 is entered from either block 146 or block 162 to determine whether there are more coordinate pairs that need to be packed. If there are not, the packing is completed, as indicated in block 166. If more coordinate pairs need to be packed, the next coordinate pair is selected in block 168, and block 112 is entered and the delta values for that pair of coordinates and succeeding pairs of coordinates are packed in the manner previously described.

It is thus apparent that the present invention provides a method and apparatus for efficiently storing coordinate data relating to geographic features. In particular, the technique of developing an escape sequence that makes use of the special value concept is important in reducing the storage size occupied by the stored data. The optimum delta storage size is determined for each coordinate direction on a per feature basis instead of for the data base as a whole. Particularly in situations where there is a large ranging change in coordinate position in one coordinate direction and a relatively small changing coordinate position in the other direction, use of the storage scheme of the present invention results in significantly less waste in storage space compared to conventional storage systems. Likewise, if there are only a few large ranging coordinate changes with the remainder being relatively small, the large ranging changes do not unduly penalize the entire set of data with respect to the storage space it occupies. Additionally, by taking advantage of situations where all of the changes along a given coordinate axis have the same sign, the necessary storage space is further reduced by making use of the global sign concept contemplated by the present invention.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A microprocessor-implemented method of storing data derived from known coordinate sets which represent a geographic feature and which correspond to coordinate locations along a plurality of coordinate axes, said method comprising the steps of:

(a) computing the changes in the coordinate locations between successive coordinate sets along each coordinate axis;

(b) selecting a plurality of different integers each representing a different allowable number of data bits that may potentially be used for storing the data;

(c) assigning to each different integer a special value that is based on and unique to the corresponding integer;

(d) calculating the number of data bits needed to represent each coordinate change along each coordinate axis using one selected integer as the allowable number of bits, with the number of data bits needed to represent each coordinate change that requires more bits than said one selected integer being calculated by taking into account the special value assigned to said one selected integer and the number of special values needed to allow representation of the coordinate change using said one selected integer as the allowable number of bits;

(e) repeating step (d) using each of the remaining selected integers as the allowable number of bits;

(f) adding, for each different integer used, the number of data bits calculated in steps (d) and (e);

(g) selecting an optimum integer for each coordinate axis by choosing the integer that corresponds to the smallest total number of bits resulting from the addition of step (f) for each coordinate axis; and (h) storing each coordinate change along each coordinate axis using said optimum integer for the coordinate axis as the allowable number of bits, with each coordinate change that requires more bits than said optimum integer being stored as a normal set of bits no greater in number than said optimum integer combined with one or more additional sets of bits each no greater in number than said optimum integer and calculated as the number of special values needed to represent the coordinate change wherein a determination of an optimum storage size of a geographic database is made on a per feature basis, in the manner described above, such that said determination would result in a reduced requirement for available storage space on a data processing storage medium versus a determination of an optimum storage sized made using the same geographic database as a whole.

2. A method as set forth in claim 1, wherein the special value assigned to each integer is equal to $2^{\Delta size-1}$, where $\Delta size$ is the integer.

3. A method as set forth in claim 1, wherein the number of data bits needed to represent each coordinate change along a coordinate axis is calculated as $$N = \Delta size\left(\frac{|x\Delta|}{2^{\Delta size-1}-1}\right) \text{ if } \frac{|x\Delta|}{2^{\Delta size-1}-1}$$

is a non-zero integral number and $$N = \Delta\text{size}\left(\frac{|x\Delta|}{2^{\Delta size-1}-1}+1\right) \text{ if } \frac{|x\Delta|}{2^{\Delta size-1}-1}$$

is other than a non-zero integral number,
where N is said number of bits, Δsize is the integer, |xΔ| is the absolute value of the coordinate change along the coordinate axis, and any faction part of $$\frac{|x\Delta|}{2^{\Delta size-1}-1}$$

is discarded.

4. A method as set forth in claim 3, wherein the special value assigned to each integer is $2^{\Delta size-1}$.

5. A method as set forth in claim 1, including the steps of:
(i) determining whether all changes in the coordinate locations between successive coordinate sets along any coordinate axis are all in one direction;
(ii) determining for said any coordinate axis whether all changes in the coordinate locations can be represented using a number of bits equal to said one selected integer without any special value needed; and
(iii) if the determinations in both steps (i) and (ii) are affirmative, assigning a sign representing said one direction to all of the changes in the coordinate locations along said any coordinate axis and reducing the sum obtained from step (f) by a selected number for said any coordinate axis.

6. A method as set forth in claim 5, wherein said selected number is equal to the number of coordinate sets minus one.

7. A microprocessor-implemented method of storing data representing the location of a geographic feature and derived from known coordinate locations of said feature along a coordinate axis, said method comprising the steps of:
(a) computing the coordinate changes between successive coordinate locations;
(b) selecting a plurality of integers each representing a different number of bits that may be used as the allowable number of bits for storing the data;
(c) assigning to each integer a special value that is determined by the integer value;
(d) using one selected integer and one selected coordinate change,
(i) if $$\frac{|x\Delta|}{N}$$

is a non-zero integral number, assigning to said one selected change a bit number equal to $$\Delta\text{size}\left(\frac{|x\Delta|}{N}\right),$$

(ii) if $$\frac{|x\Delta|}{N}$$

is other than a non-zero integral number, assigning to said one selected change a bit number equal to $$\Delta\text{size}\left(\frac{|x\Delta|}{N}+1\right),$$

where |xΔ| is the absolute value of said one selected change, N is $2^{\Delta size-1}-1$, Δsize is the value of said one selected integer, and any fractional part of $$\frac{|x\Delta|}{N}$$

is discarded;
(e) repeating step (d) using all other integers and all other coordinate changes;
(f) for each different integer used, adding the bit numbers obtained from steps (d) and (e) for all of the coordinate changes;
(g) selecting an optimum integer equal to the integer corresponding to the smallest sum of bit numbers obtained from step (f);
(h) using said optimum integer and one selected coordinate change,
(i) if $$\frac{|x\Delta|}{N_0}$$

is a non-zero integral number, storing a number of special values equal to $$\frac{|x\Delta|}{N_0}-1$$

and also storing $$x\Delta-\left(\frac{|x\Delta|}{N_0}-1\right)\left(\frac{x\Delta}{|x\Delta|}\right)(N_0),$$

(ii) if $$\frac{|x\Delta|}{N_0}$$

is other than a non-zero integral number, storing a number of special values equal to $$\frac{|x\Delta|}{N_0}$$

and also storing $$x\Delta-\left(\frac{|x\Delta|}{N_0}\right)\left(\frac{x\Delta}{|x\Delta|}\right)(N_0),$$

where xΔ is the coordinate change value, $N_0$ is $2^{\Delta size_0-1}-1$, $\Delta size_0$ is said optimum integer, and any fractional part of $$\frac{|x\Delta|}{N_0}$$

is discarded; and (i) repeating step (h) using said optimum integer and all other coordinate changes wherein a determination of an optimum storage size of a geographic database is made on a per feature basis, in the manner described above, such that said determination would result in a reduced requirement for available storage space on a data processing storage medium versus a determination of an optimum storage sized made using the same geographic database as a whole.

8. A method as set forth in claim 7, wherein the special value assigned to each integer is equal to $2^{\Delta size-1}$.

9. A method as set forth in claim 7, including the step of assigning a directional sign to all coordinate changes and reducing by a selected number the sum obtained in step (f) for any integer having a bit number assigned thereto in accordance with step (d) that is not greater than the integer, if all coordinate changes are in the same direction.

10. A method as set forth in claim 9, wherein said selected number is equal to one less than the number of coordinate locations.

11. A microprocessor apparatus for storing data representing the location of a geographic feature having known coordinate locations along a plurality of coordinate axes, said apparatus comprising:

means for computing the changes in the coordinate locations between successive coordinate sets along each coordinate axis;

means for calculating the number of bits needed to represent each coordinate change along each axis using each of a plurality of different integers as the allowable number of bits, said calculating means using a special value uniquely assigned to each different integer and calculating the number of special values needed to represent each coordinate change for each different integer;

means for adding the total number of bits calculated for each different integer to represent all coordinate changes along each axis; and means for storing each coordinate change along each axis using an optimum integer as the allowable number of bits for each axis, said optimum integer for each axis being the integer corresponding to the least total number of bits for such axis; and means for entering in storage, for each coordinate change, the number of special values needed to represent such coordinate change using said optimum integer wherein a determination of an optimum storage size of a geographic database is made on a per feature basis, in the manner described above, such that said determination would result in a reduced requirement for available storage space on a data processing storage medium versus a determination of an optimum storage sized made using the same geographic database as a whole.

12. Apparatus as set forth in claim 11, wherein the special value assigned to each integer is equal to $2^{\Delta size-1}$, where $\Delta size$ is the value of the integer.

13. Apparatus as set forth in claim 11, wherein said means for calculating is operable to calculate the number of bits needed as equal to $$\Delta size\left(\frac{|x\Delta|}{N}\right) \quad \text{if} \quad \frac{|x\Delta|}{N}$$

is a non-zero integral number and is equal to $$\Delta size\left(\frac{|x\Delta|}{N}+1\right) \quad \text{if} \quad \frac{|x\Delta|}{N}$$

is other than a non-zero integral number, where $\Delta size$ is the integer, $|x\Delta|$ is the absolute value of the coordinate change N is $2^{\Delta size-1}-1$, and any fractional part of $$\frac{|x\Delta|}{N}$$

is discarded.

14. Apparatus as set forth in claim 13, wherein the special value assigned to each integer is $2^{\Delta size-1}$.

15. Apparatus as set forth in claim 11, including:

means for assigning a sign indicating one coordinate change direction to all coordinate changes along a coordinate axis if all of the coordinate changes along said axis are in said one direction and the number of special values needed to represent each coordinate change along said axis is zero for any integer; and means for reducing the total number of bits calculated for any such integer by a number equal to the number of coordinate locations minus one.

16. A microprocessor-implemented system for storing data representing the location of a geographic feature having known coordinate locations along a coordinate axis, said system comprising:

means for computing the coordinate changes between successive coordinate locations;

means for selecting a plurality of different integers each representing a potential allowable number of bits used for storing the coordinate changes, each integer having a special value assigned thereto which has a predetermined relationship to the value of the integer;

means for calculating, for each coordinate change, the quantity $$\Delta size\left(\frac{|x\Delta|}{N}\right) \quad \text{if} \quad \frac{|x\Delta|}{N}$$

is a non-zero integral number and the quantity $$\Delta size\left(\frac{|x\Delta|}{N}+1\right) \quad \text{if} \quad \frac{|x\Delta|}{N}$$

is other than a non-zero integral number, where $\Delta size$ is the integer value, $|x\Delta|$ is the absolute value of the coordinate change, and N is $2^{\Delta size-1}-1$, and any fractional part of $$\frac{|x\Delta|}{N}$$

is discarded;

means for adding the calculated quantities for all of the coordinate changes for each different integer to obtain a total bit count for each integer;

means for selecting as an optimum integer the integer corresponding to the smallest total bit count; and means for calculating and storing for each coordinate change a number of special values assigned to the optimum integer equal to $$\frac{|x\Delta|}{N_0} - 1$$

and also storing the quantity $$x\Delta - \left(\frac{|x\Delta|}{N_0} - 1\right)\left(\frac{x\Delta}{|x\Delta|}\right)(N_0) \text{ if } \frac{|x\Delta|}{N_0}$$

is a non-zero integral number, and a number of special values assigned to the optimum integer equal to $$\frac{|x\Delta|}{N_0}$$

and also storing the quantity $$x\Delta - \left(\frac{|x\Delta|}{N_0}\right)\left(\frac{x\Delta}{|x\Delta|}\right)(N_0) \text{ if } \frac{|x\Delta|}{N_0}$$

is other than a non-zero integral number, where $x\Delta$ is the coordinate change value, $N_0$ is $2^{\Delta size_0 - 1} - 1$, $\Delta size_0$ is the value of the optimum integer, and any fractional part of $$\frac{|x\Delta|}{N_0}$$

is discarded wherein a determination of an optimum storage size of a geographic database is made on a per feature basis, in the manner described above, such that said determination would result in a reduced requirement for available storage space on a data processing storage medium versus a determination of an optimum storage sized made using the same geographic database as a whole.

17. A system as set forth in claim 16, wherein the special value assigned to each integer is $2^{\Delta size - 1}$.

18. A system as set forth in claim 16, including:

means for assigning a sign indicative of one coordinate change direction to all coordinate changes if all coordinate changes are in said one direction and the absolute value of all coordinate changes are not greater than N; and means for reducing the total bit count for any such integer by a number equal to one less than the number of coordinate locations.

* * * * *